(12) United States Patent
Uematsu et al.

(10) Patent No.: US 6,696,810 B2
(45) Date of Patent: Feb. 24, 2004

(54) WRIST STRUCTURE FOR A ROBOT

(75) Inventors: Masaaki Uematsu, Koufu (JP);
Kuniyasu Matsumoto, Yamanashi (JP);
Hiroshi Nakagawa, Yamanashi (JP)

(73) Assignee: Fanuc Ltd., Yamanishi (JP)

( * ) Notice: Subject to any disclaimer, the term of this patent is extended or adjusted under 35 U.S.C. 154(b) by 0 days.

(21) Appl. No.: 10/101,847

(22) Filed: Mar. 21, 2002

(65) Prior Publication Data

US 2002/0135334 A1 Sep. 26, 2002

(30) Foreign Application Priority Data

Mar. 21, 2001 (JP) ........................................ 2001-081225

(51) Int. Cl.7 ............................................. B25G 15/02
(52) U.S. Cl. ............................. 318/568.21; 318/568.11; 403/38; 403/39; 901/27; 901/28; 901/29
(58) Field of Search ....................... 318/568.21, 568.11; 405/38, 39; 901/29, 28, 27

(56) References Cited

U.S. PATENT DOCUMENTS

| 4,620,830 | A | * | 11/1986 | Tsuchihasi et al. | .......... | 414/735 |
| 4,624,621 | A | * | 11/1986 | Murakami et al. | .......... | 414/735 |
| 4,707,585 | A | * | 11/1987 | Monteith et al. | ...... | 219/121.79 |
| 4,708,580 | A | | 11/1987 | Akeel | .......... | 414/735 |
| 5,267,483 | A | * | 12/1993 | Torii et al. | ............... | 74/490.01 |
| 5,735,627 | A | | 4/1998 | Nagao et al. | .................. | 403/38 |

FOREIGN PATENT DOCUMENTS

| EP | 0 502832 A1 | 9/1992 |
| JP | 62-48489 | 3/1987 |
| JP | 62-48490 | 3/1987 |
| JP | 5-29691 | 4/1993 |

* cited by examiner

Primary Examiner—Rita Leykin
(74) Attorney, Agent, or Firm—Staas & Halsey LLP

(57) ABSTRACT

A member for piping and wiring to an end effector of a robot is discharged from a first wrist element into a void area in a position displaced from an axis c, being bent and loosened, and then guided to a hollow path. Any variance in a length of the piping/wiring member 30 due to rotations of second and third wrist elements is absorbed in this void area, so that twining round or scratching by a wrist can be prevented.

8 Claims, 6 Drawing Sheets

WRIST STRUCTURE FOR A ROBOT

BACKGROUND OF THE INVENTION

1. Field of the Invention

The present invention relates to an industrial robot, and more particularly to a wrist structure to be fitted to a tip of a robot forearm.

2. Description of the Prior Art

FIG. 7A and FIG. 7B illustrate a state of piping and wiring for supplying electric power, oil and air to, and discharging exhaust gas from, a spot welding gun when spot welding is to be performed by an industrial robot. Referring to FIG. 7A and FIG. 7B, a wrist 20 is fitted to a tip of a robot forearm 10. The wrist 20 is provided with swivel shafts 21, 22 and 23, differing in an axial direction of swivel from and linked to one another. The swivel shaft 23 is fitted with a spot welding gun 5 as an end effector. Also, the wrist 20 is fitted at the other end to the robot forearm 10 rotatably around the swivel shaft 21.

Further, a midway portion of piping and/or wiring member (hereinafter referred to as piping/wiring member) 4 is held by a clamp 7 fixed to the robot forearm 10, and the tip of the same member is held by another clamp 6 fixed to the spot welding gun 5.

A method for letting piping/wiring member, including a tube for flow of a pressure transmitting medium, such as hydraulic oil, and a cable for feeding of an electric power, pass through a robot forearm is also known, as disclosed in EPO 873826A2 for instance.

Where the piping/wiring member 4 is arranged outside the robot as shown in FIG. 7A, the piping/wiring member 4 is given an extra length, not so great as to obstruct the actions of wrist shafts, and connected to the gun 5. However, this method has disadvantages in that the piping and wiring come into contact with the robot arm or peripheral units and that, as shown in FIG. 7B, the piping and wiring would easily get twined round the wrist. Moreover, as a consequence of this extra length, the piping/wiring member 4 may hang down from the forearm and the wrist and, because the behavior of this hanging part is unpredictable, there arises a problem that the work procedure has to be taught to robots one by one, each requiring checkup of the hanging state.

A method of building the piping/wiring member 4 into the robot arm, disclosed in EPO 873826A2 mentioned above, involves the problem that, because of the complexity of the wrist structure, maintenance work on the wrist is troublesome and the locus is difficult to be kept accurate.

OBJECTS AND SUMMARY OF THE INVENTION

An object of the present invention is to provide a wrist structure that can prevent a piping/wiring member from getting twined round the robot wrist, coming into contact with elements of the wrist and being damaged by scratching.

In order to achieve the object stated above, a wrist according to the present invention comprises first, second and third wrist elements. Where the robot is so structured that a forearms is provided rotatably around a first axis, which is its lengthwise axis, the first wrist element is integrally fitted to the tip of this forearm. Where the forearm of the robot does not rotate, the first wrist element is fitted rotatably to the forearm. The second wrist element is provided rotatably around a second axis which crosses the first axis at a prescribed angle to the first wrist element, and the third wrist element having a hollow path is provided rotatably around a third axis which crosses the second axis at a prescribed angle to the second wrist element. Further a first transmission element on the second axis, which is one element of a drive power transmission mechanism for transmitting power to drive the second wrist element relative to the first wrist element, and a second transmission element on the second axis, which is one element of a drive power transmission mechanism for transmitting power to drive the third wrist element relative to the second wrist element, are positioned offset by a prescribed distance in the same direction relative to the third axis along the second axis. The central axis of rotation of a drive power transmission element for directly transmitting drive power to the first transmission element is arranged in parallel to the second axis, and a space for wiring and piping is provided near the point of intersection between the second axis and the third axis.

The wiring or piping to the end effector may be laid along the first wrist element, and connected to the end effector via the hollow path. Part or the whole of the first through third wrist elements and the hollow path may be provided with protective devices for reducing scratching of the wiring or piping to the end effector. Part or whole of the span from the first wrist element to the hollow path may be provided with accommodating members for accommodating the wiring or piping of the end effector.

Since the span of the piping/wiring member from the first wrist element to the third wrist element is made a void area according to the present invention, the piping/wiring member shifts in this void area and absorbs any variation in length even if the wrist elements rotate, there is no possibility for the piping/wiring member to twine round the wrist, and the parts of the piping/wiring member in sliding friction with elements of the wrist and peripheral units are reduced, resulting in reducing of damage to piping/wiring members by scratching.

BRIEF DESCRIPTION OF THE DRAWINGS

The above-described and other objects and features of the present invention will become more apparent from the following description of preferred embodiments thereof when taken in conjunction with the accompanying drawings, wherein.

DETAILED DESCRIPTION OF THE PREFERRED EMBODIMENTS

Figure 1:
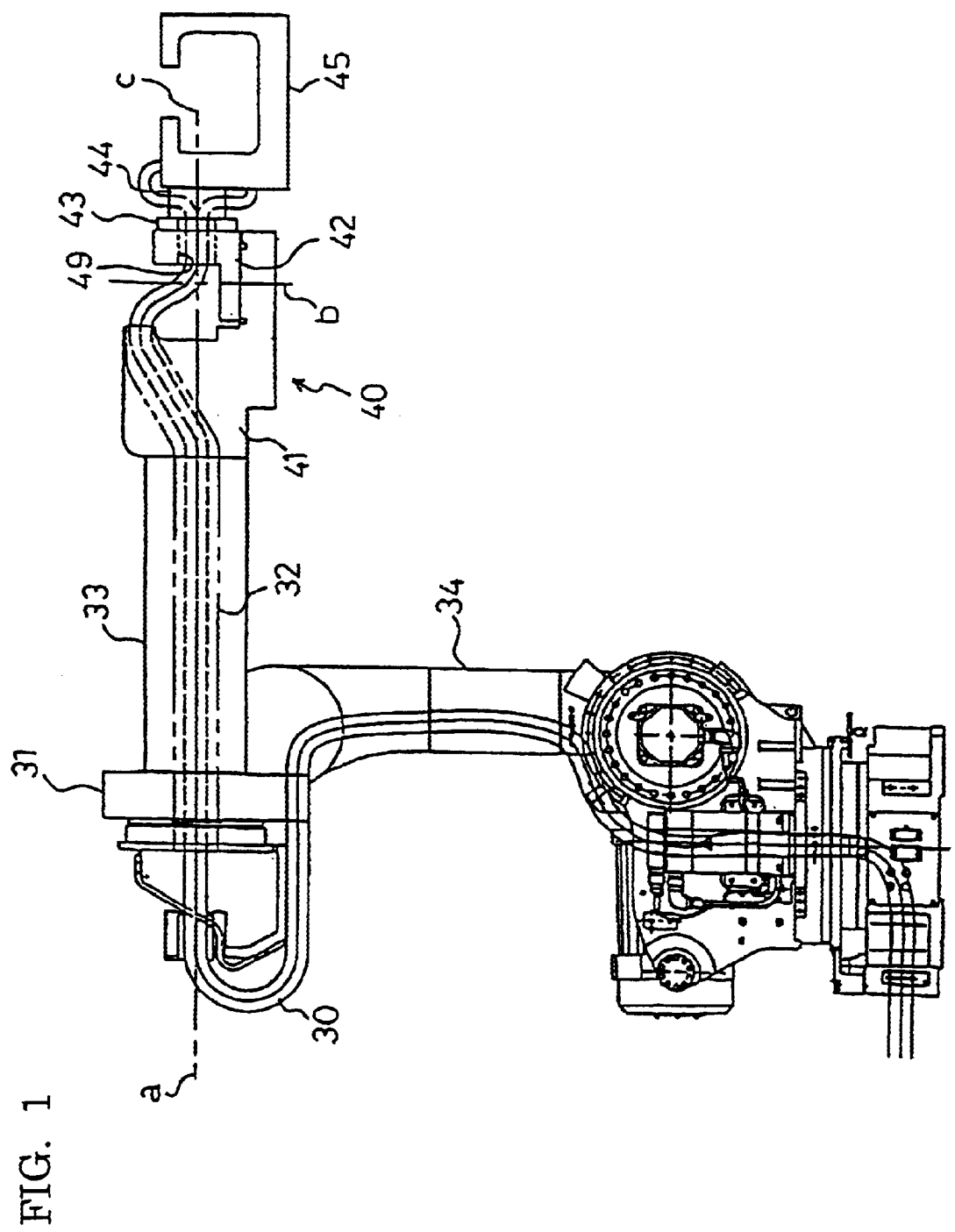
FIG. 1 schematically illustrates a robot using wrists of a wrist structure according to a first embodiment of the present invention.

FIG. 1 schematically illustrates a robot using wrists of a wrist structure according to a first embodiment of the present invention. In this embodiment of the invention, a piping/wiring member 30 for supplying electric power, oil and air to, and discharging exhaust gas from, an end effector 45 is guided to the end effector 45 along each of the robot arms or through the inside of the robot.

In this robot, to a forearm fitting member 31, which is provided at the tip of an upper arm 34 of the robot, there is fitted a hollow forearm 33 rotatably around an axis a of the forearm 33 in its lengthwise direction, and driven by a drive power source (not shown), such as a motor. To the tip of this forearm 33 is integrally fitted a wrist 40.

The wrist 40 consists of first, second and third wrist elements 41, 42 and 43. The first wrist element 41, integrally fitted to the tip of the forearm 33, is rotatable together with the forearm 33 around an axis a. The second wrist element 42 is arranged rotatably around an axis b which crosses the first wrist element 41 at a prescribed angle (substantially orthogonally in this embodiment) to the axis a, and driven by a drive power source (not shown), such as a motor. The third wrist element 43 is arranged rotatably around an axis c which crosses the second wrist element 42 at a prescribed angle (substantially orthogonally in this embodiment) to the axis b, and driven by a drive power source (not shown), such as a motor. Further, this third wrist element 43 has at its center, i.e. a portion substantially centering on the axis c, a hole of a hollow path 49 through which the piping/wiring member 30 is to be passed.

The end effector 45 is fitted to this third wrist element 43 via a relay plate 44. The piping/wiring member 30 for supplying electric power, oil and air to, and discharging exhaust gas from, the end effector 45 passes within the swivel body and the upper arm 34 of the robot or along the upper arm 34, then passes the forearm fitting member 31 and the cavity 32 of the hollow forearm 33, protrudes from the tip (the side opposite the third wrist element 43) of the first wrist element 41 of the wrist 40, passes the aforementioned hollow path 49 of the third wrist element 43 via a void area, and is connected to the end effector 45 relayed by the relay plate 44.

In particular, in the wrist structure according to the present invention, a void area is formed between the first wrist element 41 and the third wrist element 43, and this void area serves as the path for the piping/wiring member 30. A further characteristic is that this void area absorbs any twist or flexure of the piping/wiring member 30 accompanying the rotational actions of the second and third wrist elements 42 and 43. For this reason, power transmission mechanisms for rotating the second and third wrist elements 42 and 43 of the wrist 40 are arranged to be offset on one side alone relative to the axis c to form a void area.

In this embodiment shown in FIG. 1, the piping/wiring member 30 is held by a piping/wiring member guiding member (not shown) onto the first wrist element 41 rotating around the axis a, discharged from the first wrist element 41 into the void area, pass via this void area through the hole of the hollow path 49, whose central axis is substantially the axis c, around which the third wrist element 43 rotates, and is connected to the relay plate 44. It is intended to cause any twist or flexure of the piping/wiring member 30 accompanying the rotational actions of the second and third wrist elements 42 and 43 to be absorbed by this void area from the first wrist element 41 to the hollow path 49.

For this reason, the position of discharging from the first wrist element 41 into the void area is determined not to be on the center line c of the hollow path 49. As a result, in the void area between this discharging position and the hollow path 49, the piping/wiring member 30 is connected in a bent form. This bending causes this void area to absorb any variation in the length of the piping/wiring member 30 between the holding position on the first wrist element 41 and the connection point to the relay plate 44 due to rotations of the second and third wrist elements 42 and 43.

Particularly, it is preferable to design the arrangement so that there be a difference in the direction of the axis b between the position in which the piping/wiring member 30 is discharged from the first wrist element 41 into the void area and the position in which that piping/wiring member 30 enters into the third wrist element 43 (i.e. the position of the center line c of the hollow path 49).

Especially, it is preferable that, when the second wrist element 42 rotates and reaches the central position (0° position) of its swiveling range (from −θ to +θ), there is a difference between the discharging position of the piping/wiring member 30 and the center line c of the hollow path 49 in the direction of the axis b on the extension of the axis c. This makes it possible to minimize the maximum twist and flexure of the piping/wiring member 30 due to the rotation of the second wrist element 42 in the void area between the discharging position of the piping/wiring member 30 from the first wrist element 41 (the holding position on the first wrist element 41) and the position in which it enters into the third wrist element 43 when the second wrist element 42 rotates by the maximum angle (+θ or −θ) on both sides, and enables the variance of the length of the piping/wiring member 30 accompanying the rotation of the second wrist element 42 to be absorbed between the first wrist element 41 and the hollow path 49 of the third wrist element 43.

Although the foregoing description of the first embodiment refers to a case in which the wrist 40 is integrally fitted to the forearm 33 rotating around the axis a, in a robot whose forearm 33 does not rotate around the axis a, the first wrist element may be fitted to the forearm at the tip thereof so as to be rotatable around the axis a, thereby rotating the first wrist element by a drive power source, such as a motor.

Figure 2:
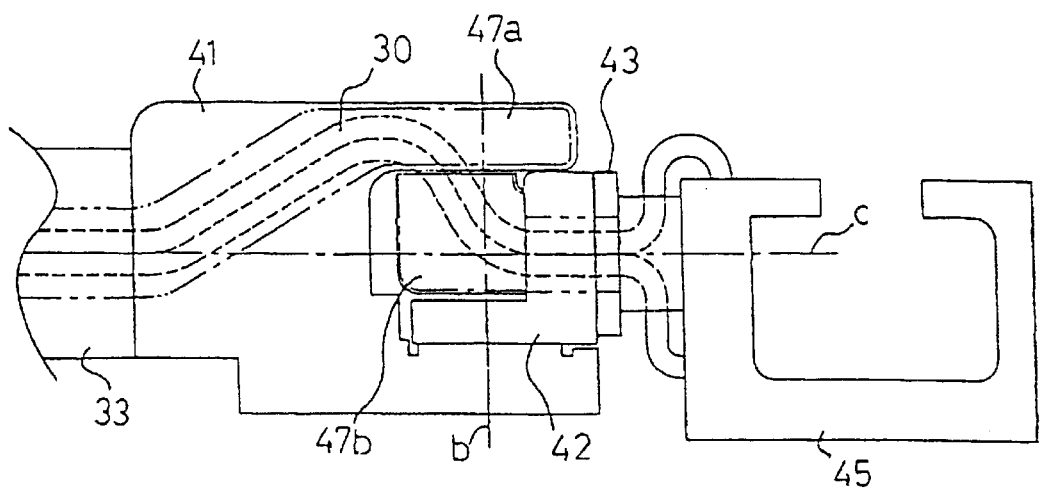
FIG. 2 illustrates a wrist structure according to a second embodiment of the present invention.

FIG. 2 illustrates a wrist structure according to a second embodiment of the present invention. In the first embodiment illustrated in FIG. 1, the piping/wiring member 30 is exposed on the path through the void area from the first wrist element 41 to the hollow path 49 of the third wrist element. This second embodiment differs from the first embodiment in that accommodating members 47a and 47b are provided to cover the exposed piping/wiring member 30. In all other respects, it is the same as the first embodiment, and the following description will concern only the differences.

On the first wrist element 41, the first accommodating member 47a for accommodating a part of the piping/wiring member 30 discharged from the first wrist element 41 is provided extending from the first wrist element 41. Adjoining the first accommodating member 47a, the second accommodating member 47b is provided on the second wrist element 42, and these first and second accommodating members 47a and 47b accommodate the part of the piping/wiring member 30 from the first wrist element 41 to the hollow path 49 of the third wrist element 43. This arrangement serves to protect the piping/wiring member 30 from dust or the like flying from outside, prevent wear due to such dust and the like, and thereby enhance the reliability of the piping and wiring.

Figure 3:
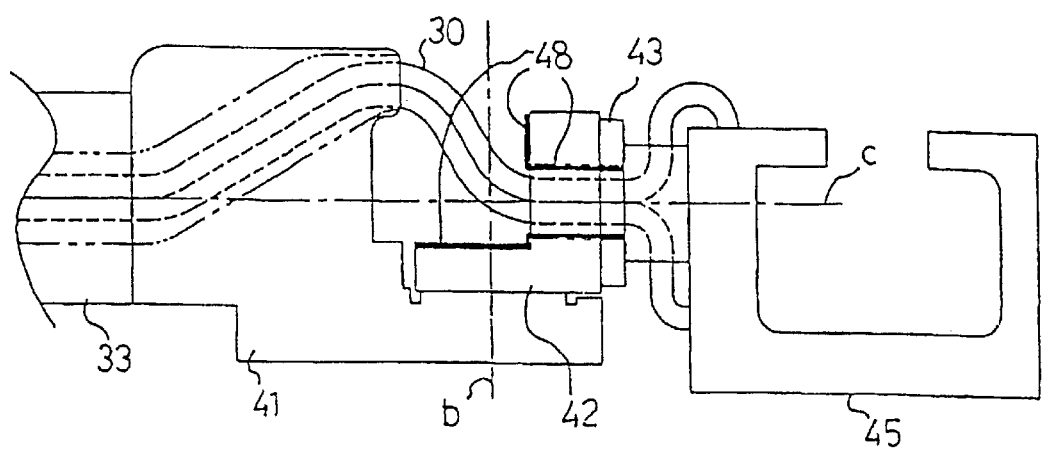
FIG. 3 illustrates a wrist structure according to a third embodiment of the present invention.

FIG. 3 illustrates a wrist structure according to a third embodiment of the present invention. In this third embodiment, protective members 48 made of Teflon sheets or the like are provided in those parts of the wrist 40 where any wrist element may come into sliding contact with the piping/wiring member 30, so that the deterioration of the piping/wiring member 30 by friction or the like can be reduced. In all other respects, it is the same as the first embodiment.

Thus, in the void area from the first wrist element 41 to the third wrist element 43, the protective members 48 are provided on the parts of wrist elements where the piping/wiring member 30 comes, or may come, into contact with wrist members as shown in FIG. 3. This makes it possible for the protective members 48 made of Teflon sheets or the like, even if the piping/wiring member 30 and any wrist element shift relative to each other and friction occurs between them, to minimize any damage that may be inflicted by friction on the piping/wiring member 30. This third embodiment shown in FIG. 3 is an example in which the wrist structure shown as the first embodiment is provided with the protective members 48. In the second embodiment shown in FIG. 2, it is also possible to provide the protective member 48 in a location where the protective member 48 comes into contact with the piping/wiring member 30.

Figure 4:
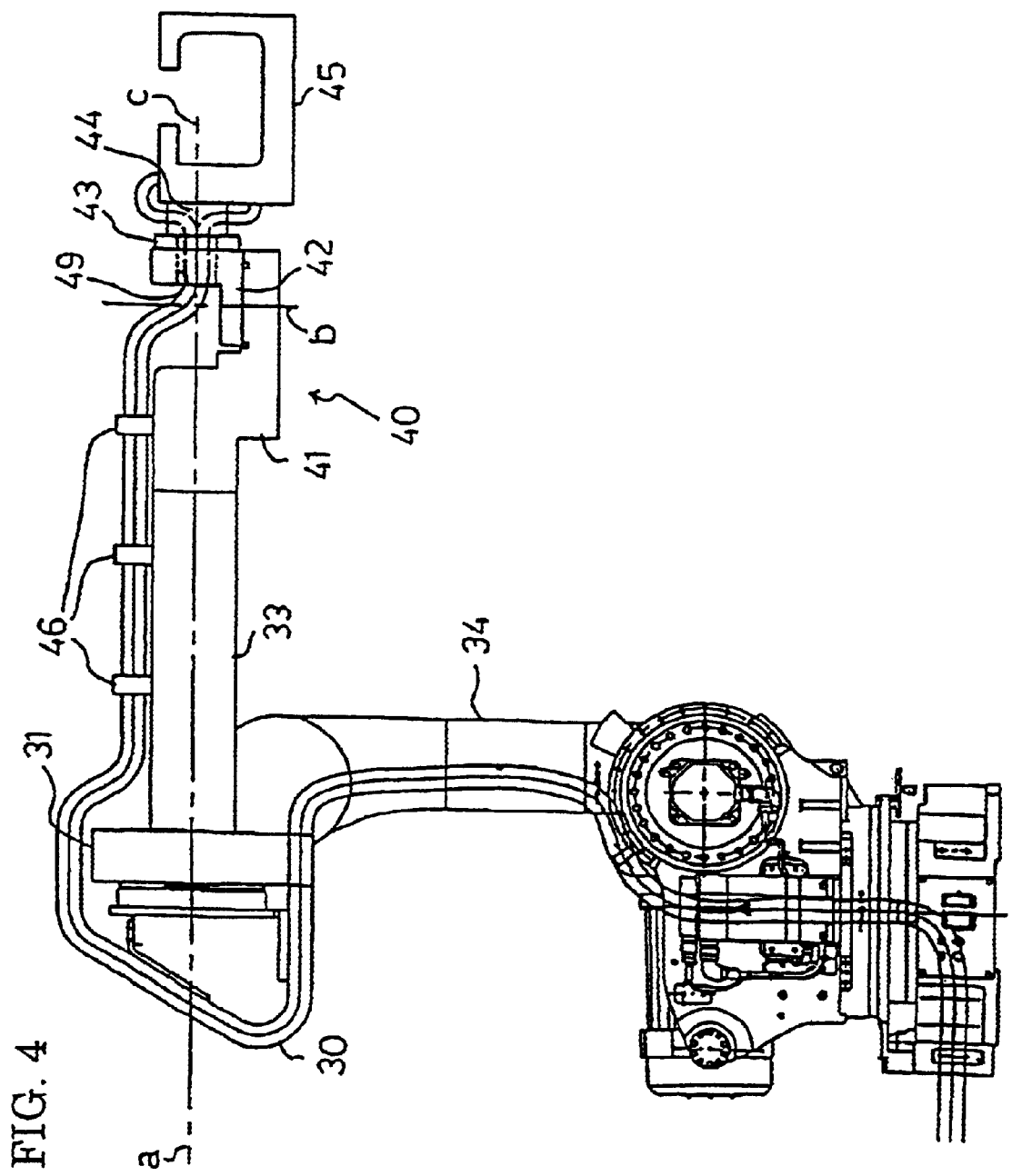
FIG. 4 schematically illustrates a robot mounting wrists of a wrist structure according to a fourth embodiment of the present invention.

FIG. 4 schematically illustrates a robot mounting a wrist structure according to a fourth embodiment of the present invention. This fourth embodiment differs from the first embodiment only in that the piping/wiring member 30 for supplying electric power, oil and air to, and discharging exhaust gas from, this end effector 45 is arranged along and outside the forearm 33 and that piping/wiring member guides 46 for holding the piping/wiring member 30 onto the forearm 33 are provided so that the piping/wiring member 30 may not be scratched. In all other respects, it is the same as the first embodiment, and the following description will concern only the differences.

In this fourth embodiment, too, the wrist 40 comprises the first, second and third wrist elements 41, 42 and 43, similarly to the first embodiment shown in FIG. 1, but it differs from the first embodiment in that, while the piping/wiring member 30 is held within the first wrist element 41 and discharged into the void area from inside in the first embodiment, in this fourth embodiment the piping/wiring member 30 is held by the piping/wiring member guides 46 outside the first wrist element, discharged into the void area and connected to the third wrist element 43. Furthermore, the piping/wiring member 30 is supported along and outside the forearm 33 by the piping/wiring member guides 46.

This embodiment, as its piping/wiring member 30 is supported outside the forearm 33 and the first wrist element 41, is suitable for use in a robot in which the forearm 33 and the first wrist element 41 do not rotate relative to each other. It is suitable for a type in which the forearm 33 rotates around the axis a and the first wrist element 41 is integrally fitted to the rotating forearm 33.

In this fourth embodiment as well, the power transmission mechanisms for rotating the second and third wrist elements 42 and 43 are partly arranged to be offset from the axis c, and a void area is formed between the first wrist element 41 and the third wrist element 43. The piping/wiring member 30 is held onto the first wrist element 41 by the guiding members 46, discharged into the void area from the first wrist element 41 toward the third wrist element 43, passes through the hollow path 49 of the third wrist element 43, and is connected to the end effector 45 via a relay plate.

The position in which the piping/wiring member 30 is discharged from the first wrist element 41 into the void area is the same as in the first embodiment. The discharging position is not on the center line c of the hollow path of the third wrist element 43. As a result, the piping/wiring member 30 is bent in the void area between this discharging position and the hollow path, and this bending causes this void area to absorb any variation in the length of the piping/wiring member 30 between the holding position on the first wrist element 41 and the hollow path 49 (the connection point to the relay plate 44) due to rotations of the second and third wrist elements 42 and 43.

In this fourth embodiment, too, the position in which the piping/wiring member 30 is discharged from the first wrist element 41 into the void area is arranged to be different from the center line c of the hollow path 49 of the third wrist element 43 in the direction of the axis b. In particular, it is appropriate that, when the second wrist element 42 has rotated to the central position of the angle of its swivel, the discharging position be a position where there is a difference in the direction of the axis b on the extension of the axis c.

This embodiment is also similar to the first embodiment in view of operation in that any variance in the length of the piping/wiring member 30 due to rotations of the second and third wrist elements 42 and 43 can be absorbed between the first wrist element 41 and the hollow path 49 of the third wrist element 43.

Further, in this fourth embodiment, too, accommodating members 47a and 47b for covering the piping/wiring member 30 or protective members 48 made of Teflon sheets or the like, arranged where the wrist elements may come into contact with the piping/wiring member 30 can be provided to alleviate any damage that may occur from scratching by the piping/wiring member 30 as described with reference to the second or third embodiment of the invention.

Figure 5:
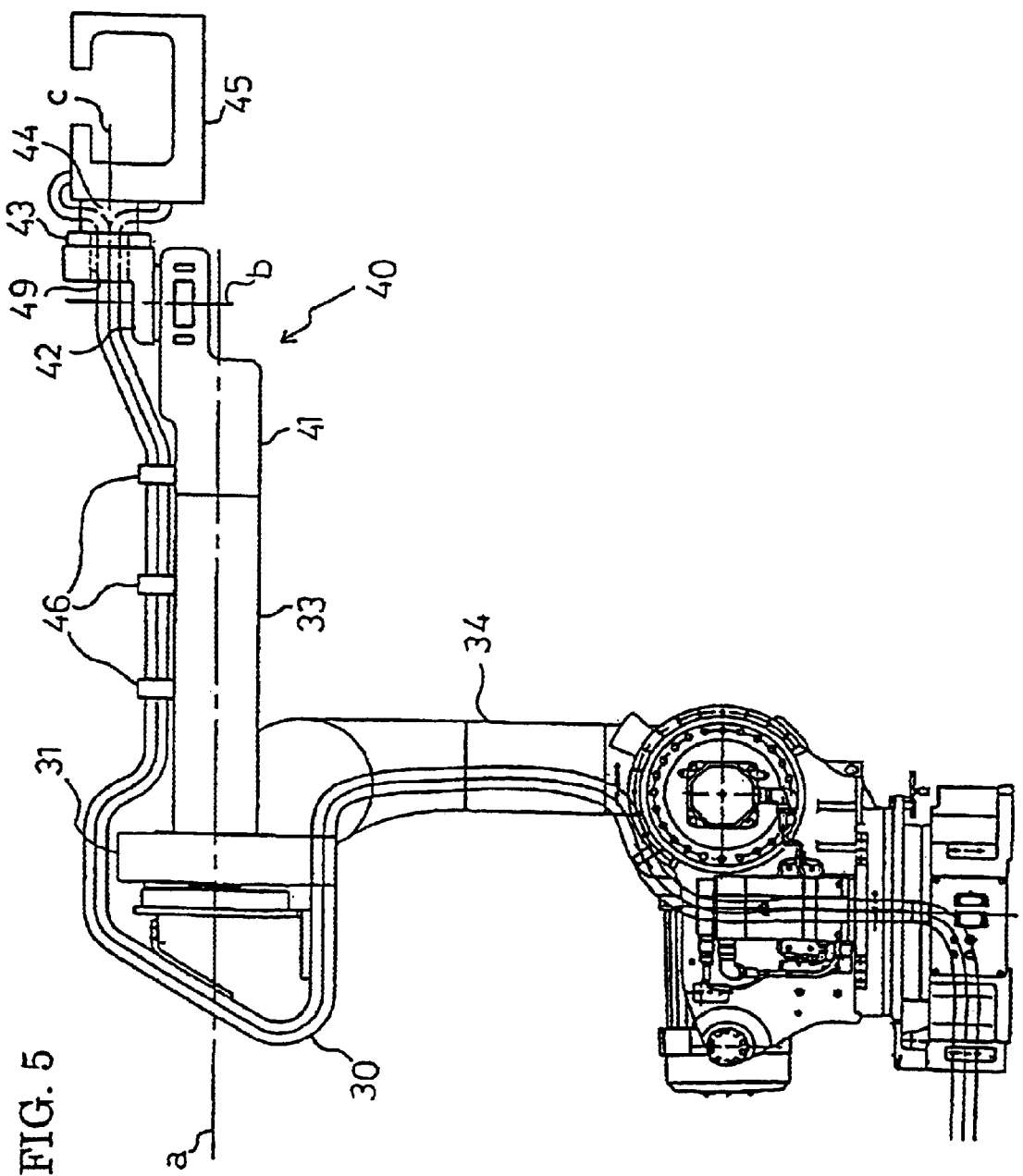
FIG. 5 schematically illustrates a robot mounting wrists of a wrist structure according to a fifth embodiment of the present invention.

FIG. 5 schematically illustrates a robot mounting a wrist structure according to a fifth embodiment of the present invention. In this fifth embodiment as well, the forearm 33 of the robot rotates around the axis a, and the first wrist element 41 of the wrist 40 is integrally fitted to this forearm 33.

In this fifth embodiment, too, the wrist 40 comprises the first, second and third wrist elements 41, 42 and 43, and the first wrist element 41 is integrally fitted to the forearm 33 at the tip thereof to be rotatable together with the forearm 33 around the axis a. The second wrist element 42 is arranged rotatably around the axis b which crosses the first wrist element 41 at a prescribed angle (substantially orthogonally in this embodiment) to the axis a, and driven by a drive power source (not shown), such as a motor. The third wrist element 43 is arranged rotatabe around the axis c which crosses the second wrist element 42 at a prescribed angle (substantially orthogonally in this embodiment) to the axis b, and driven by a drive power source (not shown), such as a motor. Further, this third wrist element 43 has at its center, i.e. a portion substantially centering on the axis c, the hole of the hollow path 49 through which the piping/wiring member is to be passed.

Although the axis a and the axis c are formed to be in substantially the same position in the direction of the axis b in the first through fourth embodiments described above with reference to FIG. 1 through FIG. 4, their positions differ in this fifth embodiment in which the axis c is offset from the axis a in the direction of the axis b, and accordingly this embodiment differs from the first through fourth embodiments in this respect. In particular, this embodiment differs from the fourth embodiment substantially in this respect alone.

The end effector 45 is fitted to this third wrist element 43 via the relay plate 44. The piping/wiring member 30 passes within the swivel body and the upper arm 34 of the robot or along the upper arm 34, supported outside the forearm 33 by the piping/wiring member guides 46 along the forearm 33 and the first wrist element 41, protrudes from the first wrist element 41 into the voice area, passes through the hollow path 49 of the third wrist element 43, and is connected to the end effector 45 relayed by the relay plate 44.

In particular in this fifth embodiment, the first wrist element and elements for transmitting power to drive the second and third wrist elements are arranged on only one side as viewed from the axis c. This results in a structure in which a large void area is formed on the other side of the axis c, and this void area serves as the passage for the piping/wiring member 30. Whereas the piping/wiring member 30 is discharged from this first wrist element 41 into the void area and connected to the relay plate 44 via the hollow path 49 of the third wrist element, the arrangement is designed to differentiate the position of the axis c from that of the piping/wiring member 30 discharged from the first wrist element 41 in the direction of the axis b so that the position of its discharging from the first wrist element 41 into the void area do not fall on the center line c of the hollow path 49. For this reason, the piping/wiring member 30 can be bent in the void area from this first wrist element 41 to the hollow path 49 of the third wrist element 43.

Any variation in the length of the piping/wiring member 30 ensuing from variations in the relative position between the holding position of the piping/wiring member 30 on the first wrist element 41 and the connection point to the relay plate 44 due to rotations of the second wrist element 42 is absorbed by bending in the void area.

Figure 6:
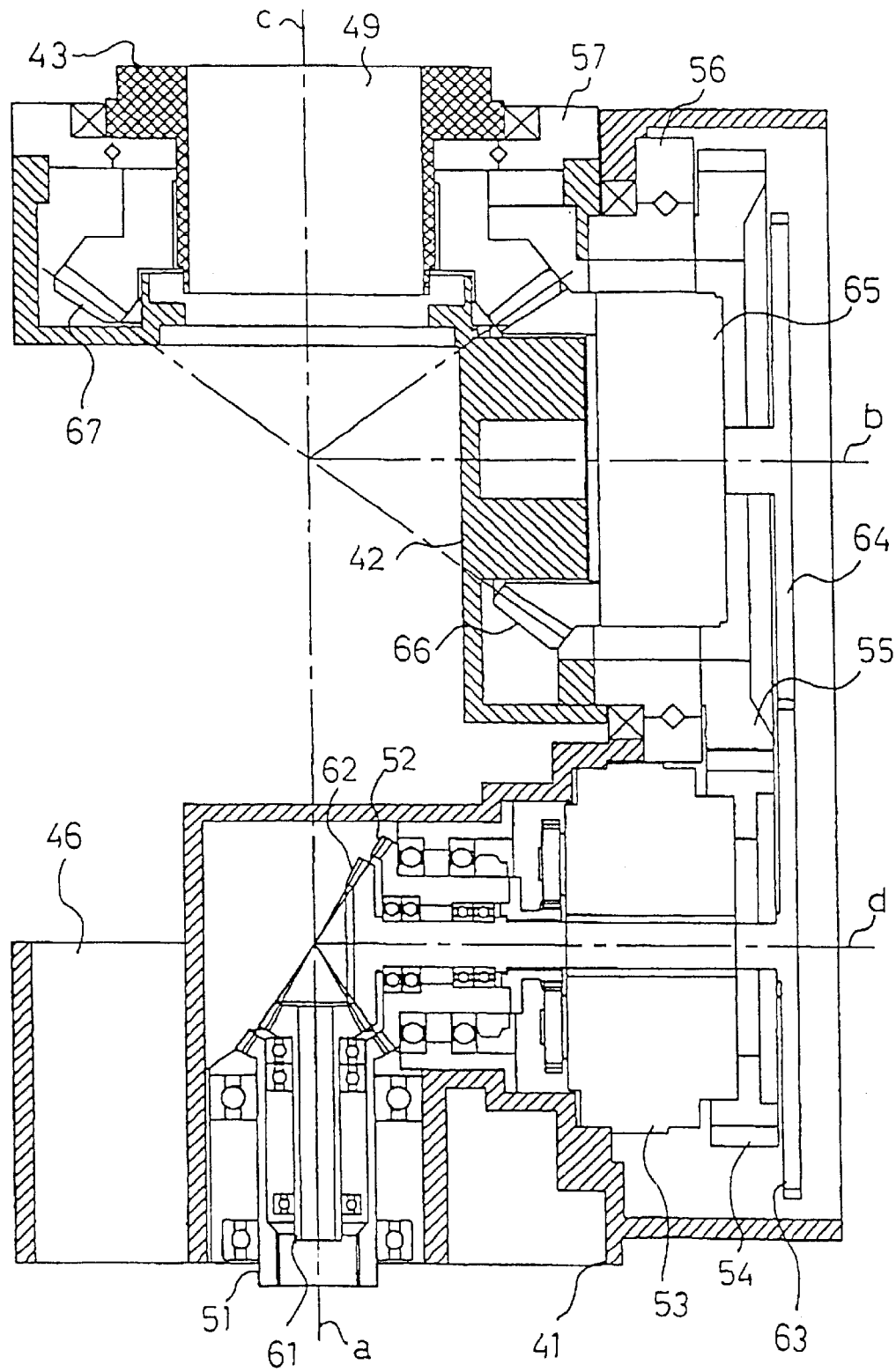
FIG. 6 illustrates an example of structure of a wrist used in the first through four the embodiments of the present invention.
Figure 7A:
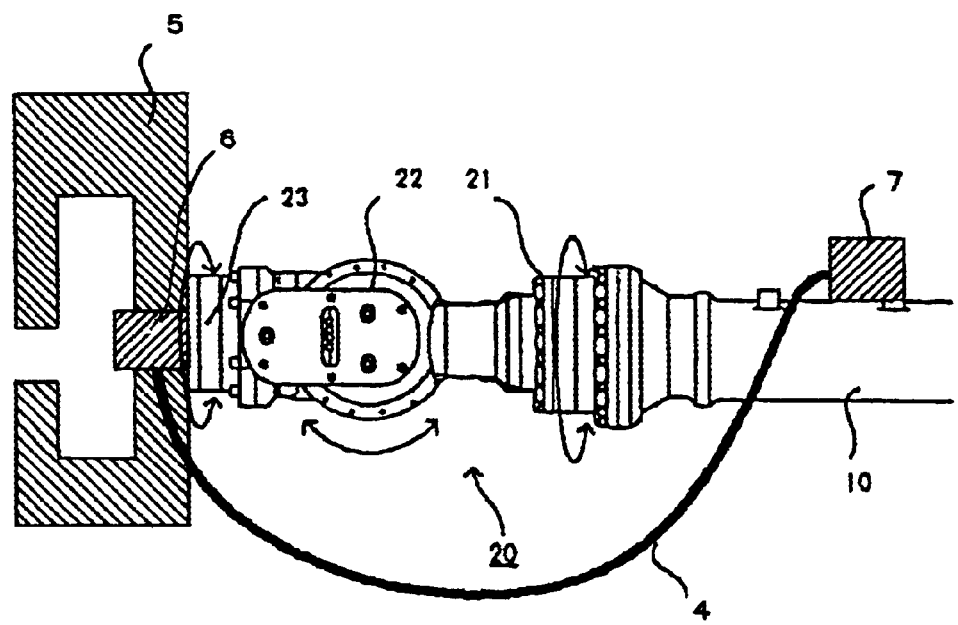
FIGS. 7A and 7B illustrate the state of piping and wiring laid according to the prior art for supplying electric power, oil and air to, and discharging exhaust gas from, a spot welding gun when spot welding is to be performed by an industrial robot.
Figure 7B:
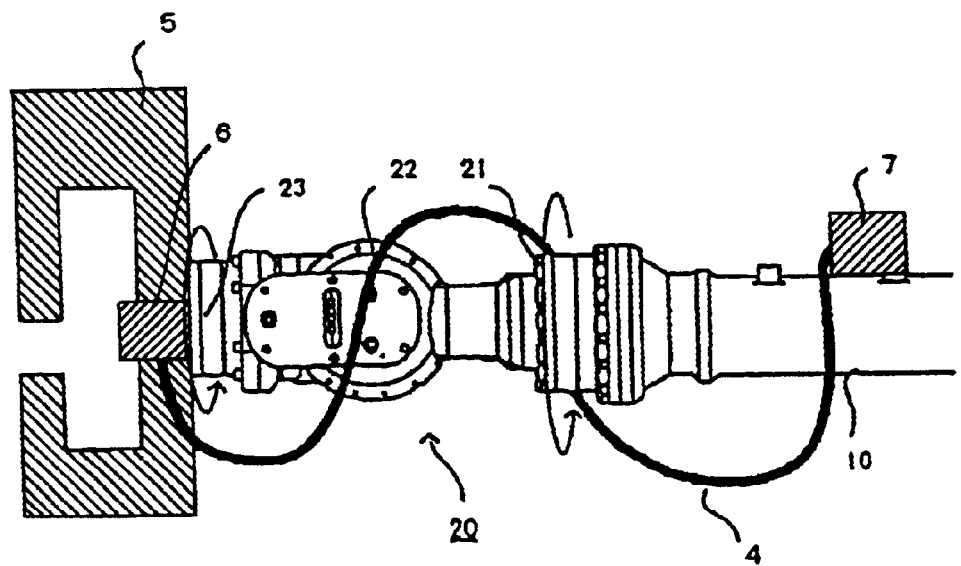

FIG. 6 illustrates an example of structure of the wrist 40 used in the first through fourth embodiments of the present invention.

To the first wrist element 41 is rotatably fitted the second wrist element 42 via a bearing 56. To the second wrist element 42 is rotatably fitted the third wrist element 43 via a bearing 57. To the first wrist element 41 is fixed a first reduction gear 53, and to the input shaft of the first reduction gear 53 is fitted a bevel gear 52 to be rotatable relative to the first wrist element 41, a gear 54 being fitted to the output shaft of the same. A bevel gear 62 and a gear 63, whose central axes are coincident with the respective central axis d of the first reduction gear 53, the bevel gear 52 and the gear 54 and which are linked to each other, are fitted rotatably to the first wrist element 41.

To the first wrist element 41 are rotatably fitted bevel gears 51 and 61, the bevel gear 51 being in mesh with the bevel gear 52 and the bevel gear 61 being in mesh with the bevel gear 62. Further, the central axes of rotation of the bevel gears 51 and 61 are coincident with the first axis a, which is the central axis of rotation of the forearm 33 of the robot, to which the first wrist element 41 is to be fitted.

To the second wrist element 42 is fitted a gear 55 to be in mesh with the gear 54, and to this second wrist element 42 is fixed a second reduction gear 65. A gear 64 fitted to the input shaft of this second reduction gear 65 is in mesh with the gear 63. To the output shaft of the second reduction gear 65 is fixed a bevel gear 66, which is in mesh with a bevel gear 67 fitted to the third wrist element 43. The gears 55 and 64 rotate around a second axis b, and the second wrist element 42 rotates around the second axis b relative to the first wrist element 41. This second axis b is in parallel to the central axis d of rotation of the gears 54 and 63 and of the bevel gears 52 and 62, crosses the first axis a at a prescribed angle, which is approximately 90° in this embodiment.

The third wrist element 43 rotates around a third axis c along with the rotation of the bevel gear 67. Further, the third wrist element 43 has a hole around this third axis c, the hole constituting the hollow path 49 through which the piping/wiring member 30 passes. Although this embodiment is an example in which the first axis a and the third axis c are coincident with each other, they need not be coincident.

According to the present invention, the piping/wiring member 30 to be connected to the end effector 45 fitted to the third wrist element 43 is connected through the hollow path 49, and on the other face of the third wrist element 43 than the side where the end effector is fitted there is provided a dedicated void area for letting the piping/wiring member 30 pass through the hollow path 49.

For this reason, according to the invention, the void area is formed on the side (the underside of the third wrist element 43 in FIG. 6) where the piping/wiring member 30 is inserted into the hollow path 49. Accordingly, in the drive power transmission mechanism for transmitting the drive power to rotate the second wrist element 42 relative to the first wrist element 41, the gear 55 (whose axis of rotation is the second axis b), which is a transmission element closer to the third wrist element 43, is arranged along the second axis b in a position offset from the third axis c. Also, in the drive power transmission mechanism for transmitting the drive power to rotate the third wrist element 43 relative to the second wrist element 42, such transmission elements as the gear 64, the reduction gear 65 and the bevel gear 66, which are closer to the third wrist element 43, are also arranged along the second axis b in a position offset from the third axis c in the same direction as the gear 55.

Thus, by arranging at least those elements which should be arranged immediately before the third wrist element 43 in positions offset from the third axis c (i.e. the central axis of rotation of the third wrist element 43 and the central axis of the hollow path 49, which is the hole into which the piping/wiring member 30 is to be inserted), the void area is formed on the side where the piping/wiring member 30 is introduced into the hollow path 49.

Further, by setting the second axis b parallel to the central axis d of rotation of the gears 54, 63, 52 and 62, the wrist can be reduced in width and the whole wrist can be built compact, as compared with the case where the axis b is orthogonal to the central axis d of rotation and also the central axis d of rotation is arranged away from the gear 55 relative to the axis a. If the axis b and the central axis d of rotation were orthogonal to each other and the central axis d of rotation were arranged closer to the gear 55 relative to the axis a, the second wrist element 42, when it rotates around the axis b, would be restricted in the range of action by interference with the gears 54 and 63, the reduction gear 53 and the like. By contrast, the parallel relation between the second axis b and the central axis d of rotation can expand the range of action of the second wrist element 42.

Moreover, the first wrist element 41 is provided with the piping/wiring member guides 46 for holding the piping/wiring member 30 guided along the inside or the outside of the forearm 33 of the robot. The piping/wiring member guides 46 in this embodiment are formed of holes to let the piping/wiring member 30 pass. After being held by the holes of these piping/wiring member guides 46, the piping/wiring member 30 is guided into the void area, then introduced into the hollow path 49 of the third wrist element 43, and connected to the end effector fitted to the third wrist element 43.

The positions where these piping/wiring member guides 46 are provided are selected off the axis c. The piping/wiring member guides 46 are so positioned that the piping/wiring member 30 held by these piping/wiring member guides 46 and discharged from the first wrist element 41 may not come into contact with elements constituting the wrist, or if they come into contact, the areas of contact may be minimized, before it reaches the hollow path 49.

In this embodiment shown in FIG. 6, the piping/wiring member guide 46 is arranged on the side opposite the positions where elements for transmitting drive power, including the gears 55 and 64, the second reduction gear 65 and the bevel gear 66 are disposed offset in one direction of the axis b, with respect to the third axis c. Such positioning is the most suitable, as will be described later in more detail, for reducing the effects of the rotations of the second and third wrist elements 42 and 43 on the piping/wiring member 30. This enables the piping/wiring member 30 held by the piping/wiring member guide 46 and discharged from the first wrist element 41 to be bent without coming into contact with elements constituting the wrist before it reaches the hollow path 49. As there are obstacles, such as the gears 55 and 64 and the second reduction gear 65, on only one side of the path space leading to the hollow path 49, but there is no such obstacles on the other side of the path space, full length of the piping/wiring member 30 is allowed to lie on the other side of the path space.

A turning force transmitted from a drive power source (not shown) is transmitted to the bevel gear 51, and the rotation of this bevel gear 51 is transmitted to the first reduction gear 53 via the bevel gear 52, reduced in speed and rotates the gear 54 fitted to the output shaft of the first reduction gear 53, rotates the gear 55 fitted to the second wrist element 42 and in mesh with the gear 54, and causes the second wrist element 42 to rotate around the axis b.

The turning force transmitted from the drive power source (not shown) is received by the bevel gear 61, and the rotation of this bevel gear 61 is transmitted to the bevel gear 62 and the gear 63 to rotate the gear 64 fitted to the input shaft of the second reduction gear 65 and in mesh with the gear 63, to rotate, with the speed reduced by the second reduction gear 65, the bevel gear 66 fitted to the output shaft, and to rotate the bevel gear 67 fitted to the third wrist element 43 and in mesh with the bevel gear 66, thereby causing the third wrist element 43 to rotate around the axis c.

Whereas the rotation of the second wrist element 42 around the axis b causes the hollow path 49 of the third wrist element 43 also to rotate around the axis b, this rotation causes the holding position of the piping/wiring member 30 at the piping/wiring member guide 46 of the first wrist element 41 and the position of the hollow path 49 to vary, which results in variation in the distance between those positions. However, as the piping/wiring member 30 is bent and loosened in the section between the piping/wiring member guide 46 and the hollow path 49, variation of the piping/wiring member 30 due to change in the positions of, and distance between, the piping/wiring member guide 46 and the hollow path 49 is absorbed by the slack of or bend of the piping/wiring member 30 between the piping/wiring member guide 46 and the hollow path 49.

Also, while the twist of the piping/wiring member 30 due to rotations around a third wrist axis is almost wholly absorbed between the holding member 46 and the hollow path 49, the twist is also absorbed by portion subsequent to the holding member 46 (toward the forearm of the robot) because the piping/wiring member 30 is only inserted in the holding member 46.

What is claimed is:

1. A robot wrist structure for use in a robot in which the forearm of the robot is rotatable around a first axis, which is a lengthwise axis of said forearm relative to a fitting base for the forearm, comprising:

a first wrist element fixed to the tip of said forearm;

a second wrist element provided rotatably around a second axis crossing said first axis at a prescribed angle to said first wrist element; and a third wrist element provided rotatably around a third axis crossing said second axis at a prescribed angle to said second wrist element and having a hollow path, wherein a first transmission element, which is one element of a drive power transmission mechanism for transmitting power to drive said second wrist element relative to said first wrist element and provided rotatably around said second axis, and a second transmission element, which is one element of a drive power transmission mechanism for transmitting power to drive said third wrist element relative to said second wrist element and provided rotatably around said second axis, are positioned offset by a prescribed distance in the same direction relative to said third axis along said second axis; and a central axis of rotation of the drive power transmission mechanism for directly transmitting drive power to said first transmission element is arranged in parallel to said second axis, and a space for wiring member and piping member is provided near a point of intersection between said second axis and said third axis.

2. The robot wrist structure according to claim 1, wherein the wiring member and/or the piping member is connected to the end effector of the robot along said first wrist element or through a penetrating hole bored in the first wrist element and by way of said hollow path.

3. The robot wrist structure according to claim 1, wherein a part of or the whole of said first through third wrist elements and of said hollow path is provided with protective devices for reducing scratching by wiring or piping to said end effector.

4. The robot wrist structure according to claim 1, wherein accommodating member for accommodating the wiring member and/or the piping member is provided in at least a part of a region from the first wrist element to said hollow path.

5. A robot wrist structure for use in a robot where the forearm is fixed to a fitting base for a forearm, comprising:

a first wrist element provided at the tip of said forearm to be rotatable around a first axis, which is a lengthwise axis of said forearm;

a second wrist element provided rotatably around a second axis crossing said first axis at a prescribed angle to said first wrist element; and a third wrist element provided rotatably around a third axis crossing said second axis at a prescribed angle to said second wrist element and having a hollow path, wherein a first transmission element, which is one element of a drive power transmission mechanism for transmitting power to drive said second wrist element relative to said first wrist element and provided rotatably around said second axis, and a second transmission element, which is one element of a drive power transmission mechanism for transmitting power to drive said third wrist element relative to said second wrist element and provided rotatably around said second axis, are positioned offset by a prescribed distance in the same direction relative to said third axis along said second axis; and a central axis of rotation of the drive power transmission mechanism for directly transmitting drive power to said first transmission element is arranged in parallel to said second axis, and a space for the wiring member and the piping member is provided near a point of intersection between said second axis and said third axis.

6. The robot wrist structure according to claim 5, wherein the wiring member and/or the piping member is connected to the end effector of the robot along said first wrist element or through a penetrating hole bored in the first wrist element and by way of said hollow path.

7. The robot wrist structure according to claim 5, wherein a part of or the whole of said first through third wrist elements and of said hollow path is provided with protective devices for reducing scratching by wiring or piping to said end effector.

8. The robot wrist structure according to claim 5, wherein accommodating member for accommodating the wiring member and/or the piping member is provided in at least a part of a region from the first wrist element to said hollow path.

* * * * *

UNITED STATES PATENT AND TRADEMARK OFFICE
CERTIFICATE OF CORRECTION

PATENT NO. : 6,696,810 B2 Page 1 of 1
DATED : February 24, 2004
INVENTOR(S) : Masaaki Uematsu et al.

It is certified that error appears in the above-identified patent and that said Letters Patent is hereby corrected as shown below:

Title page,
Item [75], Inventors, change "Koufu" to -- Yamanashi --.
Item [73], Assignee, change "Yamanishi" to -- Yamanashi --.

Signed and Sealed this

Twenty-fifth Day of May, 2004

JON W. DUDAS
*Acting Director of the United States Patent and Trademark Office*